(12) United States Patent
Chen et al.

(10) Patent No.: US 8,920,929 B2
(45) Date of Patent: *Dec. 30, 2014

(54) HALOGEN FREE, FLAME RETARDANT COMPOSITIONS

(75) Inventors: Given Jing Chen, Shanghai (CN); Wilson Xiao Wei Yan, Hangzhou (CN); Bin Li, Shanghai (CN); Lan Lu, Shanghai (CN); Weiming Wayne Ma, Shanghai (CN); Lotus Hua Huang, Shanghai (CN); David Hong Fei Guo, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/514,173

(22) PCT Filed: Dec. 18, 2009

(86) PCT No.: PCT/CN2009/075724
§ 371 (c)(1),
(2), (4) Date: Jun. 6, 2012

(87) PCT Pub. No.: WO2011/072458
PCT Pub. Date: Jun. 23, 2011

(65) Prior Publication Data
US 2012/0244365 A1     Sep. 27, 2012

(51) Int. Cl.
| B32B 27/40 | (2006.01) |
| B32B 27/32 | (2006.01) |
| C08K 5/523 | (2006.01) |
| C08K 3/22 | (2006.01) |
| C09D 153/00 | (2006.01) |

(52) U.S. Cl.
USPC ............. 428/425.8; 428/425.9; 428/461; 523/436; 524/126; 524/127; 524/128; 524/141; 524/437; 524/505

(58) Field of Classification Search
USPC ........... 428/425.8, 425.9, 461; 524/115, 126, 524/127, 128, 141, 437, 505; 523/436
See application file for complete search history.

(56) References Cited

U.S. PATENT DOCUMENTS

| 4,144,202 A | 3/1979 | Ashcraft et al. |
| 4,385,133 A | 5/1983 | Alberino et al. |
| 4,522,975 A | 6/1985 | O'Connor et al. |
| 4,857,600 A | 8/1989 | Gross et al. |
| 5,167,899 A | 12/1992 | Jezic |
| 5,246,783 A | 9/1993 | Spenadel et al. |
| 5,575,965 A | 11/1996 | Caronia et al. |
| 6,190,772 B1 | 2/2001 | Yamano et al. |
| 6,496,629 B2 | 12/2002 | Ma et al. |
| 6,714,707 B2 | 3/2004 | Rossi et al. |
| 6,753,372 B1 | 6/2004 | Garcia Duran et al. |
| 7,332,677 B2 * | 2/2008 | Xu et al. .................... 174/110 R |
| 7,355,089 B2 | 4/2008 | Chang et al. |
| 7,417,083 B2 * | 8/2008 | Kosaka et al. ................ 524/100 |
| 7,438,748 B2 | 10/2008 | Cogen et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 8,076,581 B2 * | 12/2011 | Schmidt .................. 174/110 SR |
| 8,455,576 B2 * | 6/2013 | Chen et al. ..................... 524/127 |
| 2006/0199884 A1 | 9/2006 | Hoenig et al. |
| 2006/0199906 A1 | 9/2006 | Walton et al. |
| 2006/0199908 A1 | 9/2006 | Cheung et al. |
| 2006/0211819 A1 | 9/2006 | Hoenig et al. |
| 2007/0078222 A1 | 4/2007 | Chang et al. |
| 2007/0112127 A1 | 5/2007 | Soediono et al. |
| 2008/0220273 A1 | 9/2008 | Weaver |
| 2009/0275690 A1 | 11/2009 | Weaver et al. |
| 2011/0011616 A1 * | 1/2011 | Brown et al. ............. 174/113 R |
| 2012/0065307 A1 * | 3/2012 | Cogen et al. .................. 524/127 |

FOREIGN PATENT DOCUMENTS

| CN | 101225224 A * | 7/2008 |
| CN | 101278001 | 10/2008 |
| CN | 101624469 | 1/2010 |
| JP | H08-157685 A | 6/1996 |
| WO | 03042296 | 5/2003 |
| WO | 2005090427 | 9/2005 |
| WO | 2008057886 | 5/2008 |
| WO | WO 2008057886 A2 * | 5/2008 |
| WO | 2008080111 | 7/2008 |
| WO | 2008112393 | 9/2008 |
| WO | 2011/019536 A1 | 2/2011 |

OTHER PUBLICATIONS

International Search Report for PCT App. No. PCT/CN2009/075724 mailed on Sep. 23, 2010

(Continued)

Primary Examiner — Thao T. Tran
(74) Attorney, Agent, or Firm — Whyte Hirschboeck Dudek S.C.

(57) ABSTRACT

The present disclosure provides a flexible, halogen-free, flame retardant composition. The composition includes from about 25 wt % to about 95 wt % of a thermoplastic polyurethane (TPU); from about 5 wt % to about 50 wt % of an olefin block copolymer (OBC); and from about 30 wt % to about 70 wt % of a flame retardant. The flame retardant is selected from resorcinol bis(diphenyl 5 phosphate) (RDP), bis diphenyl phosphate (BDP), bisphenol-A bis(diphenyl phosphate) (BPADP), aluminum trihydrate (ATH), a nitrogen/phosphorus-based halogen-free flame retardant, epoxidized novolac resin, and combinations thereof. The composition requires no compatibilizer for the TPU and OBC. The composition finds application in wire and cable structures.

13 Claims, 2 Drawing Sheets

(56) References Cited

OTHER PUBLICATIONS

Dobrynin, A.V., "Phase coexistence in random copolymers", J. Chem Phys. (1997) 107 (21) pp. 9234-9238.

Potemkin, I.I., "Micro separation in correlated random copolymers: Mean-field theory and fluctuation corrections", Physical review E (1998) 57 (6) pp. 6902-6912.

* cited by examiner

HALOGEN FREE, FLAME RETARDANT COMPOSITIONS

BACKGROUND

Known are thermoplastic polyurethane (TPU)-based halogen-free flame retardant compositions. TPU provides mechanical properties, low heat deformation, and flexibility suitable for many applications. TPU, however, carries several disadvantages. TPU is expensive and it also has a high material density. Furthermore, TPU-based halogen-free flame retardants shrink, particularly when injection molded.

Composites of TPU with conventional polyolefin fail to overcome these disadvantages of TPU. Compatibility between TPU and conventional polyolefin is poor due to the polarity difference between the components. Addition of conventional polyolefin to TPU typically decreases the flame retardant performance of the final composite. Moreover, TPU/polyolefin composites suffer from a dramatic drop in heat deformation properties compared to TPU alone. Polyolefin elastomers, such as ethylene-based elastomers, typically have a melting temperature below 100° C.

A need exists for a halogen-free TPU-based composition that maintains the superior mechanical properties and heat deformation performance of TPU, while not compromising the flame retardant performance. A need further exists for a TPU-based halogen-free flame retardant composition that does not shrink when injection molded.

SUMMARY

The present disclosure is directed to halogen-free flame retardant compositions with good flexibility, low heat deformation, and low shrinkage.

The disclosure provides a composition. In an embodiment, a composition is provided and includes from about 25 wt % to about 95 wt % of a thermoplastic polyurethane (TPU); from about 5 wt % to about 50 wt % of an olefin block copolymer (OBC); and from about 30 wt % to about 70 wt % of a flame retardant. The flame retardant is selected from resorcinol bis(diphenyl phosphate) (RDP), bis diphenyl phosphate (BDP), bisphenol-A bis(diphenyl phosphate) (BPADP), aluminum trihydrate (ATH), a nitrogen/phosphorus-based halogen-free flame retardant, epoxidized novolac resin, and combinations thereof.

The composition does not require a compatibilizer for the TPU and the OBC. In an embodiment, the composition is compatibilizer-free.

The disclosure provides another composition. In an embodiment, a composition is provided and includes a thermoplastic polyurethane resin and flame retardant (TPU/FR) compound and from about 1 wt % to about 40 wt % of an olefin block copolymer resin and flame retardant (OBC/FR) compound. The composition further includes from about 30 wt % to about 70 wt % total flame retardant based on the total weight of the composition.

The present disclosure provides a process. In an embodiment, a process for producing a composition is provided and includes blending a thermoplastic polyurethane (TPU) resin with a flame retardant (FR) and forming a TPU/FR compound. The process includes blending an olefin block copolymer (OBC) resin with a flame retardant (FR) and forming an OBC/FR compound. The process includes blending the TPU/FR compound and the OBC/FR compound. The process includes forming a flame retardant composition comprising from about 5 wt % to about 40 wt % OBC resin and from about 30 wt % to about 70 wt % total flame retardant based on the total weight of the composition.

The present disclosure provides a coated conductor. In an embodiment, a coated conductor is provided and includes a metal conductor and a coating on the metal conductor. The coating includes a composition containing thermoplastic polyurethane, an olefin block copolymer, and a flame retardant.

An advantage of the present disclosure is an improved flexible, halogen-free, flame retardant composition.

An advantage of the present disclosure is the provision of a flame retardant composition with good flexibility and low heat deformation that does not compromise flame retardant performance.

An advantage of the present disclosure is the provision of a flame retardant TPU/OBC blend that requires no compatibilizer to blend the TPU with the OBC.

An advantage of the present disclosure is the provision of a flame retardant composition with low heat deformation.

An advantage of the present disclosure is an injection molded article composed of the TPU/OBC/FR composition, the article exhibiting no, or substantially no, shrinkage.

An advantage of the present disclosure is a conductor coated with the composition that passes the VW-1 test.

DETAILED DESCRIPTION

Figure 1A:
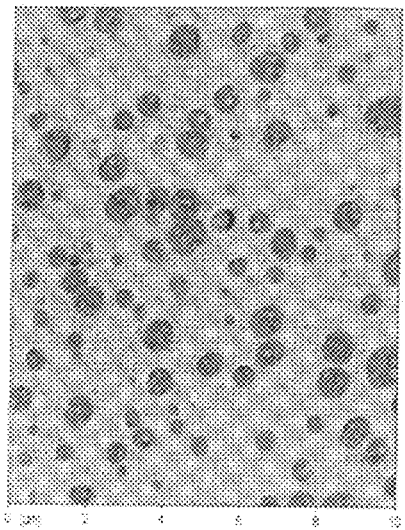
FIGS. 1A and 1B are atomic force microscopy (AFM) images of a composition in accordance with an embodiment of the present disclosure.
Figure 1B:
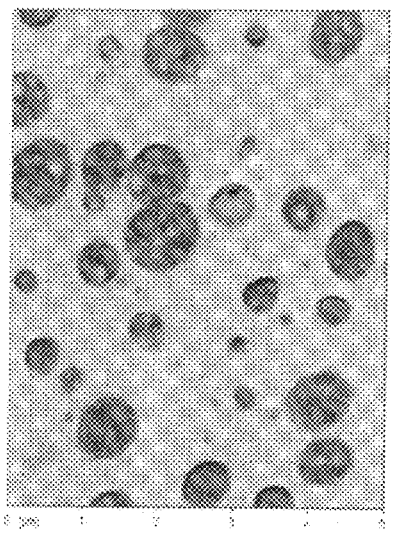

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, the amount of the various components in the flame retardant component of the inventive compositions, and the various characteristics and properties by which these compositions and the wire and cable sheathing made from these compositions are defined.

"Wire" is a single strand of conductive metal, e.g., copper or aluminum, or a single strand of optical fiber.

"Cable" is at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" is a mixture or blend of two or more components.

"Polymer blend" (and like terms) is a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and interpolymers.

"Interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Olefin-based polymer" (and like terms) is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

"Halogen-free" (and like terms) is a composition without or substantially without halogen content, i.e., contain less than 2000 mg/kg of halogen as measured by ion chromatography (IC) or a similar analytical method. Halogen content of less than this amount is considered inconsequential to the efficacy of the composition as a wire or cable covering.

"Intumescent flame retardant" (and like terms) is a flame retardant that yields a foamed char formed on a surface of a polymeric material during fire exposure.

The present disclosure provides a composition. The composition includes a thermoplastic polyurethane (TPU), an olefin block copolymer (OBC), and a flame retardant (FR). The flame retardant is selected from resorcinol bis(diphenyl phosphate) (RDP), bis(diphenyl phosphate) (BDP), bisphenol-A bis(diphenyl phosphate) (BPADP), aluminum trihydrate (ATH), a nitrogen/phosphorus-based halogen-free flame retardant, epoxidized novolac resin, and combinations thereof. The composition optionally includes additives such as antioxidants, UV stabilizers, colorants, processing aids, fillers and the like.

Thermoplastic Polyurethane (TPU)

A "thermoplastic polyurethane" (or "TPU") is the reaction product of a polyisocyanate (typically a di-isocyanate), one or more polymeric diol(s), and optionally one or more difunctional chain extender(s). "Thermoplastic" as used herein is a polymer that (1) has the ability to be stretched beyond its original length and retract to substantially its original length when released, and (2) softens when exposed to heat and returns to substantially its original condition when cooled to room temperature.

The TPU may be prepared by the prepolymer, quasi-prepolymer, or one-shot methods. The isocyanate forms a hard segment in the TPU and may be an aromatic, an aliphatic, or a cycloaliphatic isocyanate and combinations of two or more of these compounds. One non-limiting example of a structural unit derived from a di-isocyanate (OCN—R—NCO) is represented by formula (I):

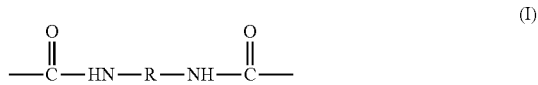

in which R is an alkylene, cycloalkylene, or arylene group. Representative examples of these di-isocyanates can be found in U.S. Pat. Nos. 4,385,133, 4,522,975 and 5,167,899. Non-limiting examples of suitable di-isocyanates include 4,4'-di-isocyanatodipheny-1-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxy functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

In one embodiment, the TPU is a polyether-based polyurethane with a Shore A hardness of 70-95 as measured by ASTM D2240.

Nonlimiting examples of suitable TPUs include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and commercial thermoplastic polyurethanes available from Bayer, Huntsman, the Lubrizol Corporation and Merquinsa.

In an embodiment, the composition contains 25 wt % to 95 wt %, or 30 wt % to 50 wt % TPU. Weight percent is based on the total weight of the composition.

In an embodiment, the TPU is a polyether-based TPU. In a further embodiment, the composition contains a single TPU or otherwise a sole TPU. The sole TPU is a polyether-based TPU.

Olefin Block Copolymer (OBC)

The present composition also includes an olefin block copolymer. An "olefin block copolymer", (or "OBC"), olefin block interpolymer", "multi-block interpolymer", "segmented interpolymer" is a polymer comprising two or more chemically distinct regions or segments (referred to as "blocks") preferably joined in a linear manner, that is, a polymer comprising chemically differentiated units which are joined end-to-end with respect to polymerized olefinic, preferable ethylenic, functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyperbranching), homogeneity or any other chemical or physical property. Compared to block interpolymers of the prior art, including interpolymers produced by sequential monomer addition, fluxional catalysts, or anionic polymerization techniques, the multi-block interpolymers used in the practice of this disclosure are characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation. More specifically, when produced in a continuous process, the polymers desirably possess PDI from 1.7 to 3.5, preferably from 1.8 to 3, more preferably from 1.8 to 2.5, and most preferably from 1.8 to 2.2. When produced in a batch or semi-batch process, the polymers desirably possess PDI from 1.0 to 3.5, preferably from 1.3 to 3, more preferably from 1.4 to 2.5, and most preferably from 1.4 to 2.

The term "ethylene multi-block interpolymer" is a multi-block interpolymer comprising ethylene and one or more interpolymerizable comonomers, in which ethylene comprises a plurality of the polymerized monomer units of at least one block or segment in the polymer, preferably at least 90, more preferably at least 95 and most preferably at least 98, mole percent of the block. Based on total polymer weight, the ethylene multi-block interpolymers used in the practice of the present disclosure preferably have an ethylene content from 25 to 97, more preferably from 40 to 96, even more preferably from 55 to 95 and most preferably from 65 to 85, percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment the quantity of extractable polymer using either a dialkyl ether or an alkane-solvent is less than 10, preferably less than 7, more preferably less than 5 and most preferably less than 2, percent of the total polymer weight.

In addition, the multi-block interpolymers disclosed herein desirably possess a PDI fitting a Schutz-Flory distribution rather than a Poisson distribution. The use of the polymerization process described in WO 2005/090427 and U.S. Ser. No. 11/376,835 results in a product having both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In a further embodiment, the polymers of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship $$Tm > -2002.9 + 4538.5(d) - 2422.2(d)^2, \text{ or}$$

(B) Mw/Mn from about 1.7 to about 3.5, and is characterized by a heat of fusion, $\Delta H$ in J/g, and a delta quantity, $\Delta T$, in degrees Celsius defined as the temperature difference between the tallest DSC peak and the tallest CRYSTAF peak, wherein the numerical values of $\Delta T$ and $\Delta H$ have the following relationships:

$$\Delta T > -0.1222(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; or (C) Elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(D) Has a molecular weight fraction which elutes between 40 C and 130 C when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (E) Has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin interpolymer may also have:

(F) Molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (G) Average block index greater than zero and up to about 1.0 and a molecular weight distribution, Mw/Mn greater than about 1.3.

Suitable monomers for use in preparing the ethylene multi-block interpolymers used in the practice of this present disclosure include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

Other ethylene multi-block interpolymers that can be used in the practice of this disclosure are elastomeric interpolymers of ethylene, a $C_{3-20}$ α-olefin, especially propylene, and, optionally, one or more diene monomers. The α-olefins for use in this embodiment of the present disclosure are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. One particular α-olefin is propylene. The propylene based polymers are generally referred to in the art as EP or EPDM polymers. Suitable dienes for use in preparing such polymers, especially multi-block EPDM type-polymers include conjugated or non-conjugated, straight or branched chain-, cyclic- or polycyclic dienes containing from 4 to 20 carbon atoms. Dienes include 1,4-pentadiene, 1,4-hexadiene, 5-ethylidene-2-norbornene, dicyclopentadiene, cyclohexadiene, and 5-butylidene-2-norbornene. One particular diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The ethylene multi-block interpolymers useful in the practice of this disclosure have a density of less than 0.90, preferably less than 0.89, more preferably less than 0.885, even more preferably less than 0.88 and even more preferably less than 0.875, g/cc. The ethylene multi-block interpolymers typically have a density greater than 0.85, and more preferably greater than 0.86, g/cc. Density is measured by the procedure of ASTM D-792. Low density ethylene multi-block interpolymers are generally characterized as amorphous, flexible and having good optical properties, e.g., high transmission of visible and UV-light and low haze.

The ethylene multi-block interpolymers useful in the practice of this disclosure typically have a melt flow rate (MFR) of 1-10 grams pr 10 minutes (g/10 min) as measured by ASTM D1238 (190° C./2.16 kg).

The ethylene multi-block interpolymers useful in the practice of this disclosure have a 2% secant modulus of less than about 150, preferably less than about 140, more preferably less than about 120 and even more preferably less than about 100, MPa as measured by the procedure of ASTM D-882-02. The ethylene multi-block interpolymers typically have a 2% secant modulus of greater than zero, but the lower the modulus, the better the interpolymer is adapted for use in this disclosure. The secant modulus is the slope of a line from the origin of a stress-strain diagram and intersecting the curve at a point of interest, and it is used to describe the stiffness of a material in the inelastic region of the diagram. Low modulus ethylene multi-block interpolymers are particularly well adapted for use in this disclosure because they provide stability under stress, e.g., less prone to crack upon stress or shrinkage.

The ethylene multi-block interpolymers useful in the practice of this disclosure typically have a melting point of less than about 125. The melting point is measured by the differential scanning calorimetry (DSC) method described in WO 2005/090427 (US2006/0199930). Ethylene multi-block interpolymers with a low melting point often exhibit desirable flexibility and thermoplasticity properties useful in the fabrication of the wire and cable sheathings of this disclosure.

The ethylene multi-block interpolymers used in the practice of this disclosure, and their preparation and use, are more fully described in U.S. Pat. Nos. 7,579,408, 7,355,089, 7,524, 911, 7,514,517, 7,582,716 and 7,504,347.

In an embodiment, the present composition contains from about 5 wt % to about 50 wt %, or from about 10 wt % to about 40 wt % of OBC.

In an embodiment, the OBC is a non-functionalized OBC. A "non-functionalized OBC" is an olefin block copolymer that is void, devoid, or otherwise free of a functional group. Nonlimiting examples of functional groups not present in the OBC include halogen, carbonyl, hydroxyl, aldehyde, carboxylate, ester, ether, peroxide, amine, amide, and/or azide.

In an embodiment, the OBC component is a sole OBC or otherwise a single OBC.

Flame Retardant

In addition to the TPU and OBC, the present composition includes a flame retardant (FR). The FR is blended with the TPU and/or OBC as discussed in detail below. The present TPU/OBC/FR composition has a lower the density relative to a similar composition in which the OBC is replaced with a like amount of TPU. Lower density compositions are typically lower cost compositions.

The flame retardant is selected from resorcinol bis(diphenyl phosphate) (RDP), bis(diphenyl phosphate) (BDP), bisphenol-A bis(diphenyl phosphate) (BPADP), aluminum trihydrate (ATH), a nitrogen/phosphorus-based halogen-free flame retardant, epoxidized novolac resin, and any combination of the foregoing.

BPADP and RDP are commercially available from Adeka Palmarole and Supresta, respectively.

A nonlimiting example of a suitable nitrogen/phosphorus-based halogen-free flame retardant is FP-2100J (piperazine pyrophosphate) available from Adeka Palmarole under the designation ADK STAB FP-2100J.

An "epoxidized novolac resin," as used herein, is the reaction product of epichlorohydrin and phenol novolac polymer in an organic solvent.

In an embodiment, the epoxidized novolac resin has the structure (II) below:

(II)

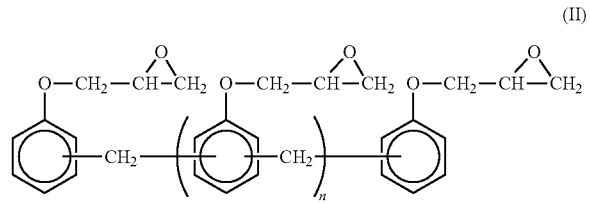

wherein n is an integer from 1 to about 1000.

In an embodiment, the composition contains epoxidized novolac resin in a lower limit of about 0.01 wt %, or about 0.1 wt %, or about 0.5 wt % and an upper amount of epoxidized novolac resin of about 20 wt %, or about 10 wt %, or about 8 wt %. Epoxidized novolac resin is available from The Dow Chemical Company, Midland, Mich.

In an embodiment, the total flame retardant present in the composition is from about 30 wt % to about 70 wt %, or from about 40 wt % to about 60 wt %, based on the total weight of the composition. The term "total flame retardant" is the weight percent sum of all the flame retardant(s) present in the composition.

In an embodiment, the flame retardant is an intumescent flame retardant.

The flame retardant of this disclosure in combination with the TPU and OBC results in a composition that exhibits a synergistic balance of flame retardance, low shrinkage, low heat deformation, and desirable tensile properties. Among these properties are a tensile stress greater than 5.8 (or greater than 6, or greater than 7) MegaPascals (MPa); a tensile elongation larger than 90%, or greater than 100%, or greater than 150%, or greater than 200% (ASTM D638); a heat deformation ratio less than 50% (or less than 40%, or less than 30%) at 150° C. (UL1581-2001); flame retardance sufficient to pass the VW-1 test (UL1581) and good flexibility and softness (Shore A hardness of less than 92 as measured by ASTM D2240).

The TPU is a continuous phase in which the OBC and the flame retardant are dispersed. The flame retardant is also dispersed in the OBC. Applicants have surprisingly discovered a halogen-free flame retardant TPU/OBC composite that requires no compatibilizer for the TPU and OBC. A "compatibilizer" is a composition added to promote miscibility between the TPU and OBC. Compatibility between TPU and conventional polyolefin is typically poor due to the polarity difference between TPU and conventional polyolefin thereby requiring a compatibilizer to promote blending. The OBC component unexpectedly is compatible with the TPU, thereby eliminating the need for a compatibilizer. In other words, the present composition is void, devoid, or otherwise free of a compatibilizer. Nonlimiting examples of compatibilizers (i.e., compositions not present in the present composition) include maleic anhydride, styrenic block copolymer, acrylates, and acetates. A compatibilizer-free TPU/OBC composite is advantageous as it reduces cost and reduces processing time and reduces processing equipment.

The present TPU/OBC/FR composition may contain one or more additives such as, but not limited to, antioxidants (e.g., hindered phenols such as, for example, IRGANOX™ 1010 a registered trademark of Ciba Specialty Chemicals), phosphites (e.g., IRGAFOS™ 168 a registered trademark of Ciba Specialty Chemicals), UV stabilizers, light stabilizers (such as hindered amines), plasticizers (such as dioctylphthalate or epoxidized soy bean oil), thermal (melt processing) stabilizers, mold release agents, waxes (such as polyethylene waxes), processing aids (such as oils, organic acids such as stearic acid, metal salts of organic acids), and colorants or pigments, to the extent that these additives do not interfere with the desired physical or mechanical properties of the articles made from the compositions of the present disclosure. In an embodiment, the total amount of additives, if present at all, is greater than zero, e.g., 0.01, to 2 wt %, more typically 0.1 to 1, wt %, based on the total weigh of the final composition.

In an embodiment, the composition includes a single TPU, a single OBC, one or more of the flame retardants, and optional additives.

In an embodiment, the composition exhibits good dimensional stability. The present composition shows a low amount of, or no, or substantially no, shrinkage during processing. The present composition has a shrinkage ratio less than the shrinkage ratio for a comparative flame retardant composition whereby the thermoplastic component for the comparative flame retardant composition is composed only of a TPU. In an embodiment, the present composition has a shrinkage ratio from 0 to less than 0.3, or from 0 to less than 0.2.

In an embodiment, the composition is void, or devoid of a halogen or is otherwise halogen-free.

In an embodiment, the composition is void, or devoid of a crosslinked polymer or is otherwise crosslink-free.

The present composition may comprise two or more embodiments disclosed herein.

The present disclosure provides a process. In an embodiment, a process for producing a composition is provided and includes blending a TPU resin with a first flame retardant (FR) and forming a TPU/FR compound. The process includes blending an OBC resin with a second flame retardant (FR) and forming an OBC/FR compound. The process includes blending the TPU/FR compound with the OBC/FR compound, and forming a flame retardant composite composition comprising from about 25 wt % to 95 wt % TPU, from about 5 wt % to about 40 wt % OBC and from about 30 wt % to about 70 wt % total flame retardant. The first flame retardant and the second flame retardant may be the same or different. The first flame retardant and/or the second flame retardant may include one, two, or more individual flame retardants.

The TPU/FR compound includes from about 30 wt % to about 70 wt % TPU resin and from about 70 wt % to about 30 wt % total FR based on the total weight of the TPU/FR compound.

The OBC/FR compound includes from about 30 wt % to about 70 wt % OBC resin and from about 70 wt % to 30 wt % total FR based on the total weight of the OBC/FR compound.

In an embodiment, the process includes blending from about 10 wt % to about 50 wt % of the OBC/FR compound with from about 90 wt % to about 50 wt % TPU/FR compound.

In an embodiment, the process produces a composition comprising from about 99 wt % to about 60 wt % of a TPU/FR compound and from about 1 wt % to about 40 wt % an OBC/FR compound. The composition includes about 30 wt % to about 70 wt % total flame retardant, based on the total weight of the final composition.

In an embodiment, the final composition includes from about 25 wt % to about 50 wt % TPU and from about 10 wt % to about 30 wt % OBC based on total weight of the final composition.

Applicants have surprisingly discovered that (i) blending FR with separate and individual respective amounts of TPU resin and OBC resin and (ii) subsequently blending the TPU/FR compound with the OBC/FR compound uniformly blends and compatibilizes the TPU, the OBC, and the flame retardant(s) and advantageously contributes to the elimination of a compatibilizer in the final TPU/OBC/FR composition.

Nonlimiting examples of suitable compounding equipment include internal batch mixers, such as a Banbury or Bolling internal mixer, a Haake mixer, a continuous single or twin screw extruder, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The TPU resin and/or the OBC resin are dried before compounding. The TPU resin, typically in pellet form, is typically dried at a temperature from 80 to 100° C., or from 90 to 95° C., for at least 6 hours, or from 6 to 10 hours under vacuum. The OBC resin, typically in pellet form, is dried at a temperature from 20 to 50° C., or from 40 to 50° C., for at least 6 hours, or from 6 to 10 hours under vacuum. The compounding temperature for the TPU, OBC and FR is typically from the melting point of the OBC, e.g., 120° C., to 220° C., more typically from 160 to 200° C.

In some embodiments the additives are added as a pre-mixed masterbatch. Such masterbatches are commonly formed by dispersing the additives, either separately or together, into an inert plastic resin, e.g., one of the plastic matrix components. Masterbatches are conveniently formed by melt compounding methods.

Articles composed (in whole or in part) of the present composition include fibers, ribbons, sheets, tapes, pellets, tubes, pipes, weather-stripping, seals, gaskets, foams, footwear wire & cable jacket/insulation applications, AC plug, SR connector, watch straps, handles, grips, soft touch articles and buttons, automotive applications, glass run channel, automotive interior panels, body seal, window seals, extruded articles, bellows, flexible wiring such as flexible wiring for consumer electronics, power cable, power charger wire for cell phones and/or computers, computer data cords, power cords, appliance wiring material, building wire, automotive wire, and consumer electronic accessory cords.

The present disclosure provides a coated conductor. The coated conductor includes a metal conductor and a coating on the metal conductor. The coating includes the present composition. In particular, the coating includes a composition comprising thermoplastic polyurethane, an olefin block copolymer and a flame retardant.

A "metal conductor," as used herein, is at least one metal wire and/or at least one metal cable. The coated metal conductor may be flexible, semi-rigid, or rigid. The coating (also referred to as a "jacket" or a "sheath" or "insulation") is on the metal conductor or on another polymeric layer around the conductor. The coating includes the present composition. The composition may be any composition as disclosed herein. As used herein, "on" includes direct contact or indirect contact between the coating and the metal conductor. "Direct contact" is a configuration whereby the coating immediately contacts the metal conductor, with no intervening layer(s) and/or no intervening material(s) located between the coating and the metal conductor. "Indirect contact" is a configuration whereby an intervening layer(s) and/or an intervening structure(s) and/or intervening material(s) is/are located between the metal conductor and the coating. The coating may wholly or partially cover or otherwise surround or encase the metal conductor. The coating may be the sole component surrounding the metal conductor. Alternatively, the coating may be one layer of a multilayer jacket or sheath encasing the metal conductor.

The coating may have any of the properties as discussed above for the present composition. In an embodiment, the coated conductor passes the VW-1 test as measured in accordance with UL-1581.

The coated conductor, such as a coated wire or a coated cable (with an optional insulation layer), with a jacket comprising the composition disclosed herein can be prepared with various types of extruders, e.g., single or twin screw types. A description of a conventional extruder can be found in U.S. Pat. No. 4,857,600. An example of co-extrusion and an extruder can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1.

The wire and cable constructions (i.e., a coated metal conductor) of this disclosure are made by extruding the present composition onto the conductor or onto the bundle of insulated conductors to form a coating (or a jacket) around the insulated conductors. The thickness of the jacket or insulation depends on the requirements of the desired end use application. Typical thickness of the jacket or insulation is from about 0.010 inches to about 0.200 inches, or from about 0.015 inches to about 0.050 inches. The present composition may be extruded into the jacket from previously made composition. Usually the present composition is in the form of pellets for easy feeding into the extruder. The wire and cable jacket or insulation may be extruded directly from the compounding extruder without going through the separate step of pelletizing the present composition. This one-step compounding/extrusion process would eliminate one heat history step for the composition.

In one embodiment, the composition of this disclosure can be applied as a covering to a cable, e.g., like a sheath or insulation layer, in known amounts and by known methods (for example, with the equipment and methods described in U.S. Pat. Nos. 5,246,783 and 4,144,202). Typically, the composition is prepared in a reactor-extruder equipped with a cable-coating die and after the components of the composition are formulated, the composition is extruded over the cable as the cable is drawn through the die. The sheath is then typically subjected to a cure period which takes place at temperatures from ambient up to but below the melting point of the composition until the article has reached the desired degree of crosslinking. Cure may begin in the reactor-extruder.

Nonlimiting examples of embodiments of the present disclosure are provided below.

A composition (E1) is provided comprising from about 25 wt % to about 95 wt % of a thermoplastic polyurethane (TPU); from about 5 wt % to about 50 wt % of an olefin block copolymer (OBC); and from about 30 wt % to about 70 wt % of a flame retardant. The flame retardant is selected from the group consisting of resorcinol bis(diphenyl phosphate) (RDP), bis diphenyl phosphate (BDP), bisphenol-A bis(diphenyl phosphate) (BPADP), aluminum trihydrate (ATH), a nitrogen/phosphorus-based halogen-free flame retardant, epoxidized novolac resin, and combinations thereof. E2. The composition of E1 wherein the TPU is a polyester-based TPU. E3. The composition of any of E1-E2 wherein the OBC is a non-functionalized OBC. E4. The composition of any of E1-E3 wherein the composition is compatibilizer-free. E5. The composition of any of E1-E4 having a heat deformation of less than 50% at 150° C. E6. The composition of any of E1-E5 having a shrinkage ratio from 0 to less than 0.3. E7. The composition of any of E1-E6 wherein the composition is halogen-free. E8. The composition of any of E1-E7 wherein the composition is crosslink-free.

A composition (E9) is provided and comprises a thermoplastic polyurethane resin and flame retardant (TPU/FR) compound; from 1 wt % to about 40 wt % of an olefin block copolymer resin and flame retardant (OBC/FR) compound; wherein the composition comprises from about 30 wt % to about 70 wt % total flame retardant based on the total weight of the composition. E10. The composition of E9 wherein the composition comprises from about 5 wt % to about 40 wt % OBC resin based on the total weight of the composition. E11. The composition of any of E9-E10 wherein the OBC/FR compound comprises from about 70 wt % to about 30 wt % OBC resin and from about 30 wt % to about 70 wt % flame retardant.

A process for producing a composition (E12) is provided and comprises blending a thermoplastic polyurethane (TPU) resin with a flame retardant (FR) and forming a TPU/FR compound; blending an olefin block copolymer (OBC) resin with a flame retardant (FR) and forming an OBC/FR compound; blending the TPU/FR compound and the OBC/FR compound; and forming a flame retardant composition comprising from about 5 wt % to about 40 wt % OBC resin and from about 30 wt % to about 70 wt % total flame retardant based on the total weight of the composition.

A coated conductor (E13) is provided and comprises a metal conductor; and a coating on the metal conductor, the coating comprising a composition comprising thermoplastic polyurethane, an olefin block copolymer, and a flame retardant. E14. The coated conductor of E13 wherein the coating comprises a composition of any of E1-E11.

TEST METHODS

Heat Deformation (HD) Heat deformation testing is conducted according to UL 1581-2001. For each formulation two parallel sample plaques are placed into an oven and preheated at 150° C. for one hour. The pre-heated samples are pressed with the same loading at 150° C. for one hour. Afterwards the pressed samples, without removal of weights, are placed in an ASTM room with setting temperature at 23° C. for additional one hour. The change of the thickness of the sample plaques are recorded and heat deformation ratio is calculated according to $HD\% = (D_0 - D_1)/D_0 * 100\%$ in which $D_0$ represents the original sample thickness and $D_1$ represents the sample thickness after the deformation process. Calculated deformation ratios for the two parallel samples are averaged.

Melt index (MI) is measured in accordance with ASTM D 1238 at 190° C. with a 2.16 kg weight.

Shrinkage ratio is determined by measuring the dimension difference of injection molded plaques immediately upon removal of the mold and then after 1 hour of ambient cooling. The length and the width of molded plaques with original size 60 mm×60 mm×2 mm is (1) summed immediately upon removal from the mold (SUM1) and (2) summed after 1 hour of ambient cooling (SUM2). Shrinkage ratio=(SUM1−SUM2)/SUM1.

Surface hardness tests are conducted on a Shore S1A Digital Durometer instrument according to ASTM D 2240 in an ASTM room. Samples with thickness of 6 mm are used and three parallel testing results for one formulated sample are recorded and averaged.

Tensile tests are conducted on an INSTRON 5565 tensile tester. Plaques are cut into bell-shape specimens using a die cutter. Tensile strength (TS) and tensile elongation (TE) tests are carried out according to ASTM D 638 at room temperature. The speed is 50 mm/min.

UL-94 is the Underwriters' Laboratory (UL) Bulletin 94 Tests for Flammability of Plastic Materials for Parts in Devices and Appliances. The material tested is UL 94 V-0 classified if:

None of the five test specimens burn for over 10 seconds at any time when the burner flame is removed.
  The total burning time of the 10 ignition test does not exceed 50 seconds.
  No test specimen burns either with a flame or afterglow to the clamp.
  No burning drops should fall which would cause the cotton underneath to ignite from any test specimen.
  The afterglow burning of no test specimen exceeds 30 seconds.

The material tested is UL 94 V-1 classified if:

None of the five test specimens burn for over 30 seconds at any time when the burner flame is removed.
  The total burning time of the 10 ignition test does not exceed 250 seconds.

No test specimen burns either with a flame or afterglow to the clamp.

No burning drops should fall which would cause the cotton underneath to ignite from any test specimen.

The afterglow burning of no test specimen exceeds 60 seconds.

The material tested is UL 94 V-2 classified if:

None of the five test specimens burn for over 30 seconds at any time when the burner flame is removed.

The total burning time of the 10 ignition test does not exceed 250 seconds.

No test specimen burns either with a flame or afterglow to the clamp.

Only such burning pieces may fall from the test specimen, which burn only momentarily, and of which some ignite the cotton underneath.

The afterglow burning of no test specimen exceeds 60 seconds.

Volume resistivity (Ohm-cm) at 23±2° C. and 55±5° (Relative humidity), with 1000 volts direct current, is measured in accordance with GB 1410-89. Molded sample specimens in the size of 100 mm×100 mm×2 mm are used for volume resistivity tests, which are conducted on a ZC-36 High Resistance Meter (Shanghai Precision and Scientific Instrument Corp., Shanghai, China).

VW-1 is an Underwriters' Laboratory (UL) flame rating for wire and sleeving. It denotes "Vertical Wire, Class 1", which is the highest flame rating a wire or sleeve can be given under the UL 1441 specification. The VW-1 FR test is conducted in an UL94 chamber in accordance with method 1080 of UL-1581. The test is performed by placing the wire or sleeve in a vertical position. Test specimens are limited to the dimension of 200 mm×2.7 mm×1.9 mm. The specimens are hung on a clamp with longitudinal axis vertical by applying 50 g loading on the distal end. One paper flag (2 cm×0.5 cm) is applied on the top of the wire. The distance of flame bottom (highest point of the burner oracle) to the bottom of flag is 18 cm. Flame is applied for 45 continuous seconds. After flame time (AFT), uncharred wire length (UCL), and uncharred flag area percentage (flag uncharred) is recorded during and after combustion. Four or five specimens are tested for each sample. Any of the following constitutes "not pass": (1) cotton under the specimen is ignited, (2) the flag is burned out, and (3) dripping with flame.

By way of example, and not by limitation, examples of the present disclosure will now be provided.

EXAMPLES

1. Materials

Table 1 provides the materials used in the examples.

TABLE 1

| Component | Material | Preparation |
|---|---|---|
| A | Pellethane ™ 2103-90AE, polytetramethylene glycol ether (TPU); from Lubrizol Advanced Materials | Dried at 90° C. for at least 6 hours under vacuum |
| B1 | INFUSE D9100 (OBC) from The Dow Chemical Company | Dried at 47° C. for at least 6 hours under vacuum |
| B2 | INFUSE D9507 (OBC) from The Dow Chemical Company | Dried at 47° C. for at least 6 hours under vacuum |
| C1 | Resorcinol Bis(Diphenyl Phosphate) (RDP), grade Fyrolflex ® RDP from Supresta | Used as received |

TABLE 1-continued

| Component | Material | Preparation |
|---|---|---|
| C2 | Bis(Diphenyl Phosphate) (BDP) was obtained from Adeka with grade name FP600 | Used as received |
| C3 | N/P-based FR, ADEKA FP2100J (piperazine pyrophosphate) | Used as received |
| C4 | Aluminum hydroxide (ATH), bulk density 0.2-0.5 g/cc, grade H42M, from Showa Chemical | Used as received |
| C5 | Epoxidized novolac (EN) DEN-438 from The Dow Chemical Company | Used as received |
|  | Irgafos ™ 168 and Irganox ™ 1010 (anti-oxidant package) from Ciba Specialty Chemicals | Used as received |
|  | Clariant MB Moongrey Master Batch from Clariant Corporation | Used as received |
|  | Triglycidyl isocyanurate (TGIC) | Used as received |

2. TPU/OBC Composites

Dried TPU is firstly fed into a lab-scale Haake Mixer (Haake Polylab OS RheoDrive 7, Thermo Scientific) for plasticization, and then OBC is fed into the mixing room for compounding. The raw materials are mixed for 8 minutes at 170° C. with a shear speed of 60 rpm. Optionally, TPU and OBC may be pre-mixed first and fed into the Haake Mixer together for compounding.

TABLE 2

TPU and OBC blends

| Sample ID | A | B | C | D | Pure TPU | Pure OBC |
|---|---|---|---|---|---|---|
| TPU2103-90 | 90 | 80 | 70 | 60 | 100 | — |
| D9100 | 10 | 20 | 30 | 40 | — | 100 |
| Stabilizer | 0.4 | 0.4 | 0.4 | 0.4 | — | — |
| Properties |  |  |  |  |  |  |
| Tensile strength/MPa | 36.7 | 25.2 | 23.6 | 12.9 | — | — |
| Stdv./MPa | 4.3 | 6.2 | 3.3 | 3.7 | — | — |
| Tensile elongation/% | 568 | 459 | 488 | 359 | — | — |
| Stdv./% | 35 | 76 | 50 | 86 | — | — |
| Heat deformation/% | 14 | 17 | 24 | 29 | 12 | 100 |
| Density/g · cm$^{-3}$ | 1.125 | 1.094 | 1.064 | 1.022 | 1.179 | 0.891 |
| Volume resistivity ($10^{13}$ Ω · cm) | 2.97 | 3.50 | 1.05 | 2.97 | 3.22 | 3.33 |

Component proportions are in weight % based on total weight of final composition
Stdv. = standard deviation Table 2 shows different formulations and properties of TPU/OBC blends. Tensile stress/elongation, heat deformation at 150° C., material density and volume resistance are measured for each formulated sample. TPU/OBC blends with OBC resins loading up to 30% by the weight of the total composition display superior tensile properties with tensile stress larger than 23 MPa and tensile elongation larger than 450%, heat deformation ratio at 150° C. lower than 25%. For the purpose of comparison, heat deformation at 150° C., density and volume resistivity are also measured for pure TPU and OBC as shown in Table 2. Gradual decrease of the total material density is observed when increasing OBC loading in the TPU/OBC compositions. The TPU/OBC blends show improved heat deformation performance compared to pure OBC due to the continuous TPU matrix in the polymer composition. The TPU/OBC blends shows comparable volume resistivity when compared to both pure TPU and OBC.

Morphology of TPU/OBC blends are shown in FIGS. 1A-B and FIGS. 2A-B. Two atomic force microscopy (AFM) images of Sample B with scale bar of 5 μm and 10 μm are respectively shown in FIGS. 1A and 1B. Sample B comprises 20 wt % OBC, and shows the size of OBC domains (dark-circle in the images) is around several hundred nanometers.

Figure 2A:
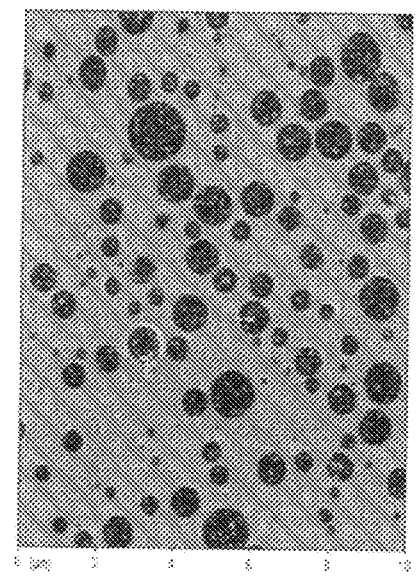
FIGS. 2A and 2B are AFM images of a composition in accordance with an embodiment of the present disclosure.
Figure 2B:
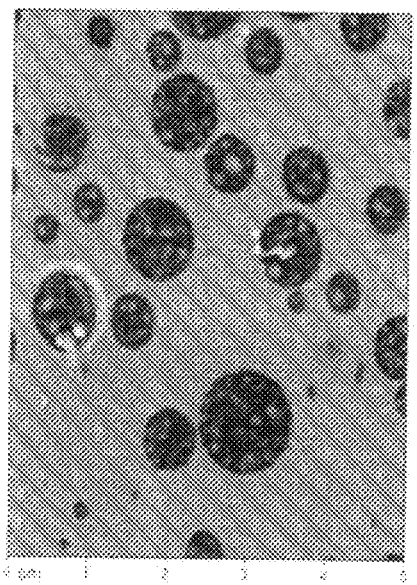

Two atomic force microscopy (AFM) images of Sample D with scale bar of 5 μm and 10 μm are respectively shown in FIGS. 2A and 2B. Sample D contains 40 wt % OBC with the domain size from several hundred nanometers to around one micro-meter. Samples B and D both indicate a good dispersion of OBC in continuous TPU matrix.

When the loading of OBC resins is up to 40 wt %, OBC shows a good dispersion in the continuous TPU matrix with domain sizes in the range of several hundred nanometers. The morphology of the TPU/OBC blends is in accordance with the good mechanical properties. The present TPU/OBC blends surprisingly show good compatibility without the use of compatibilizers. Tensile properties and heat deformation performance at 150° C. are suitable for wire and cable applications.

3. TPU/FR Composites and OBC/FR Composites

Two different processing machines are used for compounding—a Haake mixer (Haake Polylab OS RheoDrive 7, thermo Scientific) and twin screw extruder. The details for compounding are provided in Table 3.

TABLE 3

|  | OBC + FP2100J/ BDP or RDP | TPU + FP2100J/ BDP or RDP | OBC/FP2100J & BDP or RDP + TPU//FP2100J & BDP or RDP |
| --- | --- | --- | --- |
| Haake Mixer |  |  |  |
| Mixing temp (° C.) | 150 | 170 | 170 |
| Shear speed (rpm) | 60 | 60 | 100 |
| Compounding time (min) | 6 | 6 | 8 |
| Respective OBC and TPU pellets are fed into the Haake mixer, then a mixture of FP2100J and BDP is added within 2 mins |  |  |  |
| Twin-screw extruder |  |  |  |
| Mixing temp (° C.) | 180 | 180 | 180 |
| Screw rate (rpm) | 180 | 200 | 200 |
| Respective OBC and TPU pellets are premixed with RDP and FP2100J in a blender, then fed into the extruder |  |  |  |

Compounds made by the different processes shown in Table 3 are pressed into plaques by using a Hot Presser at 180-185° C. The plaques with a thickness of about 1.5 mm are then subjected to a cold-presser under the same pressure and at the room temperature for 5 mins. Samples 1-3 are TPU/FR compounds, Samples 5-7 are OBC/FR compounds as shown in Table 4 below.

TABLE 4

TPU/FR Compounds (Samples 1-3) and OBC/FR Compounds (Samples 5-7) prepared in both Haake Mixer and twin-screw extruder

|  | Sample ID | | | | | |
| --- | --- | --- | --- | --- | --- | --- |
|  | 1 | 2 | 3 | 5 | 6 | 7 |
| TPU 2103-90AE | 43 | 43 | 40 |  |  |  |
| D9100 |  |  |  | 40 | 45 | — |
| D9507 |  |  |  | — | — | 40 |
| FP2100J | 40 | 45 | 45 | 45 | 45 | 45 |
| RDP | — | — | 10 | — | — | 10 |
| BDP | 15 | 10 | — | 15 | 10 | — |
| Epoxidized Novolac | 2 | 2 | — |  |  |  |
| TGIC | — | — | 4 | — | — | 4 |
| Stabilizers | 0.4 | 0.4 | 0.8 | — | — | 0.8 |
| Properties |  |  |  |  |  |  |
| Heat deformation* at 150° C./% | 21 | 15 | 18 |  |  |  |
| Tensile stress/MPa | 11.1 | 12 | 14.6 |  |  |  |
| Stdv/MPa | 0.4 | 0.5 | 0.4 |  |  |  |
| Tensile elongation/% | 393 | 256 | 155 |  |  |  |
| Stdv/% | 15 | 19 | 17 |  |  |  |
| Mimic VW-1 testing (Pass/Total) | 2/5 | 2/5 | 1/5 |  |  |  |
| Density/g · cm$^{-3}$ | 1.449 | n/m | n/m |  |  |  |

*= heat deformation values are the average of two parallel tests
Component proportions are in weight % based on total weight of final composition
Stdv. = Standard deviation Weight percent of based on total weight of each component in the final composition.

Samples 1 and 2 are prepared by Haake Mixer and Sample 3 is prepared by twin-screw extruder.

4. TPU/OBC/FR Composites via Multi-Step Compounding

The OBC/FR Compounds and the TPU/FR Compounds in Table 4 are blended at different weight ratios to prepare TPU/OBC/FR compositions. When loading of the OBC/FR composite is up to 40 wt %, heat deformation is less than 50% at 150° C., FR performance of the TPU/OBC/FR composition passes the VW-1 test, and tensile elongation is greater than 150%.

TABLE 5

Compounding TPU/FR Compounds with OBC/FR Compounds at different weight ratios and the final material properties

|  | Sample ID | | | | | | | | | | | | |
| --- | --- | --- | --- | --- | --- | --- | --- | --- | --- | --- | --- | --- | --- |
|  | Sample 1 | Sample 2 | Sample 3 | Ex 8 | Ex 9 | Ex 10 | Ex 11 | Ex 12 | Ex 13 | Ex 14 | Ex 15 | Ex 16 | Ex 17 |
| TPU | 43 | 43 | 40 | 34.4 | 30.1 | 25.8 | 25.8 | 34.4 | 25.8 | 36 | 32 | 28 | 24 |
| D9100 |  |  | — | 9 | 13.5 | 18 | 16 | 9 | 18 | 4 | 8 | 12 | 16 |
| BDP | 15 | 10 | 45 | 14 | 13.5 | 13 | 15 | 10 | 10 | 45 | 45 | 45 | 45 |
| FP2100J | 40 | 45 | 10 | 41 | 41.5 | 42 | 42 | 45 | 45 | 10 | 10 | 10 | 10 |
| EN | 2 | 2 | 4 | 1.6 | 1.4 | 1.2 | 1.2 | 1.6 | 1.2 | 4 | 4 | 4 | 4 |
| Stabil | 0.4 | 0.4 | — | 0.4 | 0.4 | 0.4 | 0.4 | 0.4 | 0.4 | 0.8 | 0.8 | 0.8 | 0.8 |

TABLE 5-continued

Compounding TPU/FR Compounds with OBC/FR Compounds at different weight ratios and the final material properties

| | Sample 1 | Sample 2 | Sample 3 | Ex 8 | Ex 9 | Ex 10 | Ex 11 | Ex 12 | Ex 13 | Ex 14 | Ex 15 | Ex 16 | Ex 17 |
|---|---|---|---|---|---|---|---|---|---|---|---|---|---|
| Properties | | | | | | | | | | | | | |
| HD | 21 | 15 | 18 | 22 | 26 | 27 | 29 | 16 | 21 | 27 | 38 | 38 | 100 |
| TS | 11.1 | 12 | 14.6 | 9.5 | 8.2 | 7.1 | 7.6 | 10.7 | 6.3 | 13 | 11.1 | 9.9 | 7.4 |
| SD | 0.4 | 0.5 | 0.4 | 0.2 | 0.4 | 0.3 | 0.1 | 0.3 | 0.9 | 0.1 | 0.3 | 0.3 | 0.3 |
| TE | 393 | 256 | 155 | 183 | 144 | 103 | 122 | 115 | 39 | 167 | 150 | 145 | 97 |
| SD | 15 | 19 | 17 | 20 | 9 | 11 | 4 | 13 | 14 | 9 | 10 | 7 | 7 |
| VW-1 | 2/5 | 2/5 | 1/5 | 5/5 | 5/5 | 5/5 | 5/5 | 5/5 | 5/5 | 2/5 | 5/5 | 5/5 | 4/4 |

Component proportions are in weight % based on total weight of final composition
Ex 8-13 = blends of Sample 1, 2 with Sample 5, 6 (from Table 4)
Ex 14-17 = blends of Sample 3 with Sample 7 (from Table 4)
HD = heat deformation
EN = epoxidized novolac
SD = standard deviation
Stabil = stabilizer
TE = tensile elongation
TS = tensile strength
VW-1 = VW-1 test The TPU/OBC/FR compositions prepared by the multi-step compounding process show improved FR performance compared to TPU/FR compositions. In addition, the TPU/OBC/FR compositions prepared by the multi-step compounding exhibit desirable tensile properties and heat deformation performance at 150° C.

Figure 3:
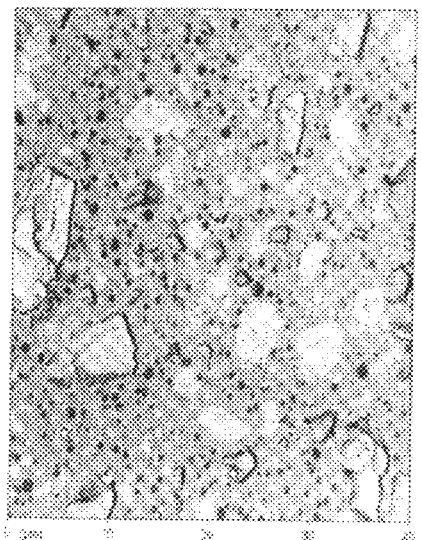
FIGS. 3-6 are AFM images of compositions in accordance with embodiments of the present disclosure.
Figure 4:
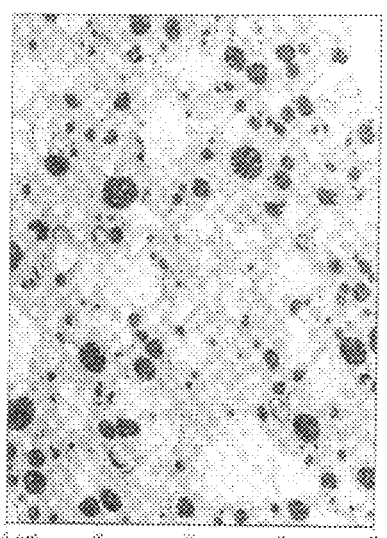
Figure 5:
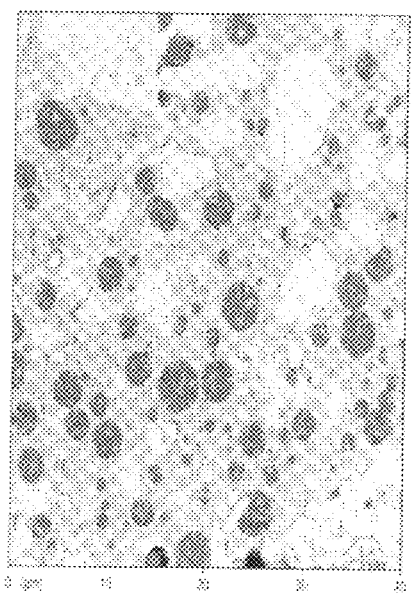
Figure 6:

Atomic Force Microscopy (AFM) images of Example 14 (FIG. 3), Example 15 (FIG. 4), Example 16 (FIG. 5), and Example 17 (FIG. 6) show the dispersion of OBC (dark-circle domain) and FR chemical particles (white particles) in the continuous TPU matrix. Example 14 comprises 10 wt % of OBC (based on total weight OBC+TPU) in the polymer matrix shows the OBC domain size is in the range of several hundred nanometers. Example 15 comprises 20 wt % of OBC (based on total weight OBC+TPU) in the polymer matrix shows the OBC domain size is up to 1 micrometer. Example 16 with 30% of OBC (based on total weight OBC+TPU) in the polymer matrix shows the OBC domain size is up to 3 micrometers. Example 17 with 40% of OBC (based on total weight OBC+TPU) in the polymer matrix shows the OBC domain size is up to 10 micrometers.

5. TPU/OBC/FR Compositions via One-Step Compounding

As illustrated in Table 6 below, a one-step compounding of TPU, OBC and FR chemicals is prepared in the Haake Mixer. With a loading of OBC up to 30% by weight percentage in the polymer matrix, tensile properties and FR performance of the formulated examples maintain a good heat deformation performance at 150° C.

TABLE 6

TPU/OBC/FR Composites via One-Step Compounding

| | Sample 2 | Ex18 | Ex 19 | Ex 20 | Ex 21 | Ex 22 | Ex 23 |
|---|---|---|---|---|---|---|---|
| TPV | 43 | 38.7 | 34.4 | 30.1 | 25.8 | 36 | 31.5 |
| D9100 | — | 4.3 | 8.6 | 12.9 | 17.2 | 9 | 13.5 |
| FP2100J | 45 | 45 | 45 | 45 | 45 | 45 | 45 |
| BDP | 10 | 10 | 10 | 10 | 10 | 10 | 10 |
| Epoxidized novolac | 2 | 2 | 2 | 2 | 2 | — | — |
| Stabilizers | 0.4 | 0.4 | 0.4 | 0.4 | 0.4 | 0.4 | 0.4 |
| Heat deformation at 150° C./% | 15 | 29 | 38 | 58 | 100 | — | — |
| Tensile stress/MPa | 12 | 10.8 | 10.3 | 9.5 | 6.4 | 7.3 | 5.8 |
| Stdv/MPa | 0.5 | 0.3 | 0.2 | 0.3 | 0.2 | 1.2 | 0.6 |
| Tensile elongation/% | 256 | 185 | 178 | 150 | 91 | 277 | 340 |
| Stdv/% | 19 | 45 | 23 | 18 | 9 | 219 | 122 |
| Mimic VW-1 testing (Pass/Total) | 2/5 | 3/5 | 5/5 | 5/5 | 5/5 | — | — |
| Density/g · cm$^{-3}$ | 1.449 | 1.388 | 1.38 | 1.334 | — | — | — |
| Volume resistivity/Ω · cm | 3.96 | 3.4 | 3.71 | 3.5 | — | — | — |

Component proportions are in wt % based on the total weight of final composition
Ex 8-13 = blends of Sample 1, 2 with Sample 5, 6 (from Table 4)

In summary, TPU/OBC/FR compositions prepared by the one-step compounding process show improved FR performance and decreased material density than TPU/FR compositions. Good tensile properties and heat deformation performance at 150° C. are obtained with the use of up to 20 wt % of OBC in the polymer matrix (i.e. TPU plus OBC). In addition, TPU/OBC/FR compositions show comparable volume resistance compared to the TPU/FR composition.

6. TPU/OBC/ATH Compositions

The compositions shown in Table 7 below are prepared on a twin screw extruder and evaluated for extrusion characteristics and properties. The following steps are used in the material preparation and evaluation:
1) With a 50 L high speed mixer, the resin ingredients in Table 7, namely the TPU 2103-90AE and the OBC D9507, are added, and mixed under 1800 RPM for 1 minute. Then the pre-mixed blends are taken out for next step.
2) The pre-mixed blends from step (1) are then extruded with the pre-mixed liquid and powder ingredients in Table 7, namely BPADP, DEN 438, AD001, antioxidants, $TiO_2$ and Clariant MB, by a twin screw extruder (ZSK 26) with two feeders, respectively. The extrusion is conducted under a barrel temperature under 170° C., a screw diameter of 25 mm and an L/D at 48, with an output about 25 kg/hr. Finally, the pellets are obtained and dried under 120° C. for 6 hrs for next step.
3) The injection molded plaques with a dimension of 165×12.7×3.18 mm for ASTM D638 tensile test and a dimension of 127×12.7×1.6 mm and 127×12.7×3.2 mm for UL 94 burning test, are made with an injection molding machine (FANUC 100).
4) Tensile properties are measured on these dogbone specimens using an Instron tensile tester with ASTM D638 as the method.
Tensile elongation and peak tensile are then measured by setting crosshead speed to 50 mm/minute with the % elongation measured using an extensometer with a 25 mm initial gauge length to measure strain to break and tensile properties calculated via standard calculation using load and specimen cross-sectional area with ASTM D638 as the method.
5) Burn performance is tested using the UL-94 test on specimens of the injection molded plaques.
6) Shrinkage is characterized by measuring the dimension difference of injection molded plaques just taking out from the mold and after 1 hrs ambient cooling, respectively.

In Table 7 below, the first column of data shows Sample 4 (DFDA 1687 EXP1, using TPU only as the polymer matrix) which provides good mechanical properties as well as burning performance, but with shrinkage after injection molding.

In comparison, the second formulation (Example 24) uses olefin block copolymer (OBC) to partially replace the thermoplastic polyurethane (TPU) at a TPU/OBC ratio of 85/15 wt %. The testing results show good mechanical properties and burning performance. Meanwhile, the MFR decreased with an improved shrinkage with less dimension change of injection molded plaques.

The third formulation (Example 25) increases the loading of olefins block copolymer (OBC) which blends with TPU/OBC a ratio of 70/30 wt %. The testing results also show good mechanical properties and burning performance. With increased loading of OBC, the melt index (MI) is even lower and the shrinkage has been further improved with nearly no dimension change of injection molded plaques.

TABLE 7

Formulations and properties of TPU/OBC/ATH FR compositions for the injection molding of AC power plug

| Formulation # | Sample 4 | Ex 24 | Ex 25 |
|---|---|---|---|
| Description | control | TPU/OBC = 85/15 | TPU/OBC = 70/30 |
| 2103-90AE | 35.37 | 30.07 | 24.76 |
| OBC D9507 |  | 5.30 | 10.62 |
| Showa Denka ATH | 41.90 | 41.90 | 41.90 |
| BPADP (FP600) | 8.78 | 8.78 | 8.78 |
| DEN 438 | 1.76 | 1.76 | 1.76 |
| AD-001 | 0.06 | 0.06 | 0.06 |
| 168 | 0.09 | 0.09 | 0.09 |
| 1010 | 0.53 | 0.53 | 0.53 |
| TiO2 | 8.99 | 8.99 | 8.99 |
| Clariant MB | 2.53 | 2.53 | 2.53 |
| Sum (Total Wt %) | 100.00 | 100.00 | 100.00 |
| Properties | | | |
| Tensile Elongation, % | 278 | 268 | 239 |
| Tensile Strength, MPa | 17.9 | 14.5 | 12.5 |
| MI (190° C., 2.16 kg) | 6.01 | 5.18 | 3.14 |
| FR (UL 94 V0 @ 3.2 mm) | V0 | V0 | V0 |
| FR (UL 94 V0 @ 1.6 mm) | V0 | V0 | V0 |
| Shore A/D | 93/50 | 92/44 | 92/44 |
| Shrinkage | 0.19 | 0.12 | −0.03 |

Component proportions are in weight % based on total weight of final composition It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A halogen-free composition comprising:
from about 25 wt % to about 95 wt % of a thermoplastic polyurethane (TPU);
from about 10 wt % to about 40 wt % of an ethylene multi-block interpolymer comprising polymerized units of ethylene and one or more interpolymerizable comonomers selected from the group consisting of alpha-olefins of 3-30 carbon atoms, cyclo-olefins of 3-30 carbon atoms, and di- and polyolefins; and
from about 30 wt % to about 70 wt % of a flame retardant selected from the group consisting of resorcinol bis (diphenyl phosphate) (RDP), bis diphenyl phosphate (BDP), bisphenol-A bis(diphenyl phosphate) (BPADP), aluminum trihydrate (ATH), a nitrogen/phosphorus-based halogen-free flame retardant, epoxidized novolac resin, and combinations thereof.

2. The composition of claim 1 wherein the TPU is a polyether-based TPU.

3. The composition of claim 1 wherein the ethylene multi-block interpolymer is a non-functionalized ethylene multi-block interpolymer.

4. The composition of claim 1 wherein the composition is compatibilizer-free.

5. The composition of claim 1 having a heat deformation of less than 50% at 150° C.

6. The composition of claim 1 in which the ethylene multi-block interpolymer has a Mw/Mn from about 1.7 to about 3.5, at least one melting point, Tm, in degrees Celsius, and a density, d, in grams/cubic centimeter, where in the numerical values of Tm and d correspond to the relationship $Tm > -2002.9 + 4538.5(d) - 2422.2(d)^2$.

7. The composition of claim 6 in which the ethylene multi-block interpolymer is characterized by Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships: ΔT>−0.1299 (ΔH)+62.81 for ΔH greater than zero and up to 130 J/g ΔT>48° C. for ΔH greater than 130 J/g wherein the CRYSTAF peak is determined using at least 5 percent of the cumulative polymer, and if less than 5 percent of the polymer has an identifiable CRYSTAF peak, then the CRYSTAF temperature is 30° C.

8. The composition of claim 7 in which the ethylene multi-block interpolymer has an elastic recovery, Re, in percent at 300 percent strain and 1 cycle measured with a compression-molded film of the ethylene/a-olefin interpolymer, and has a density, d, in grams/cubic centimeter, wherein the numerical values of Re and d satisfy the following relationship when ethylene/a-olefin interpolymer is substantially free of crosslinked phase Re>1481−1629(d).

9. The composition of claim 8 in which the ethylene multi-block interpolymer has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content based on the whole polymer within 10 percent of that of the ethylene/a-olefin interpolymer.

10. The composition of claim 9 in which the ethylene multi-block interpolymer has a storage modulus at 25° C., G'(25° C.), and a storage modulus at 100° C., G'(100° C.), wherein the ratio of G'(25° C.) to G'(100° C.) is in the range of about 1:1 to about 9:1.

11. The composition of claim 10 in which the ethylene multi-block interpolymer has a block index of at least 0.5.

12. A process for producing a composition comprising:
blending a thermoplastic polyurethane (TPU) resin with a flame retardant (FR) and forming a TPU/FR compound;
blending an olefin block copolymer (OBC) resin with a flame retardant (FR) and forming an OBC/FR compound;
blending the TPU/FR compound and the OBC/FR compound; and
forming a flame retardant composition comprising from about 5 wt % to about 40 wt % OBC resin and from about 30 wt % to about 70 wt % total flame retardant based on the total weight of the composition.

13. A coated conductor comprising:
a metal conductor; and
a coating on the metal conductor, the coating comprising a halogen-free composition comprising from about 25 wt % to 95 wt % of a thermoplastic polyurethane, from about 10 wt % to 40 wt % of an ethylene multi-block interpolymer comprising polymerized units of ethylene and one or more interpolymerizable comonomers selected from the group consisting of alpha-olefins of 3-30 carbon atoms, cyclo-olefins of 3-30 carbon atoms, and di- and polyolefins, and from about 30 wt % to about 70 wt % of a flame retardant selected from group consisting of resorcinol bis(diphenyl phosphate) (RDP), bis diphenyl phosphate (BDP), bisphenol-A bis(diphenyl phosphate) (BPADP), aluminum trihydrate (ATH), epoxidized novolac resin, and combinations thereof.

* * * * *